United States Patent
Marchesi

[15] 3,678,919
[45] July 25, 1972

[54] CLAY AREA HEATER

[72] Inventor: Carlo M. Marchesi, 31 Winter St., Lynn, Mass. 01906

[22] Filed: Oct. 16, 1970

[21] Appl. No.: 81,372

[52] U.S. Cl. .................................................126/92 R, 126/248
[51] Int. Cl. ..........................................................F24c 1/08
[58] Field of Search................126/92 R, 92 A, 92 AC, 92 C, 126/248

[56] References Cited

UNITED STATES PATENTS

| | | | |
|---|---|---|---|
| 2,596,329 | 5/1952 | Egbert | 126/248 |
| 1,037,306 | 9/1912 | Peterson | 126/248 |
| 2,950,714 | 8/1960 | Sterick | 126/92 R |
| 3,509,869 | 5/1970 | Woods | 126/248 |

FOREIGN PATENTS OR APPLICATIONS

| | | | |
|---|---|---|---|
| 405,062 | 2/1934 | Great Britain | 126/92 AC |

*Primary Examiner*—Charles J. Myhre
*Attorney*—Clarence A. O'Brien and Harvey B. Jacobson

[57] ABSTRACT

In combination with an underlying heating unit, an enlarged chamber defining housing incorporating peripheral walls having multiple rows of hollow outwardly extending projections which internally communicate with the chamber. The device is constructed of baked clay and capable of storing and radiating heat over extended periods of time.

8 Claims, 7 Drawing Figures

Patented July 25, 1972

Carlo M. Marchesi
INVENTOR

BY Clarence A. O'Brien
and Harvey B. Jacobson
ATTORNEYS

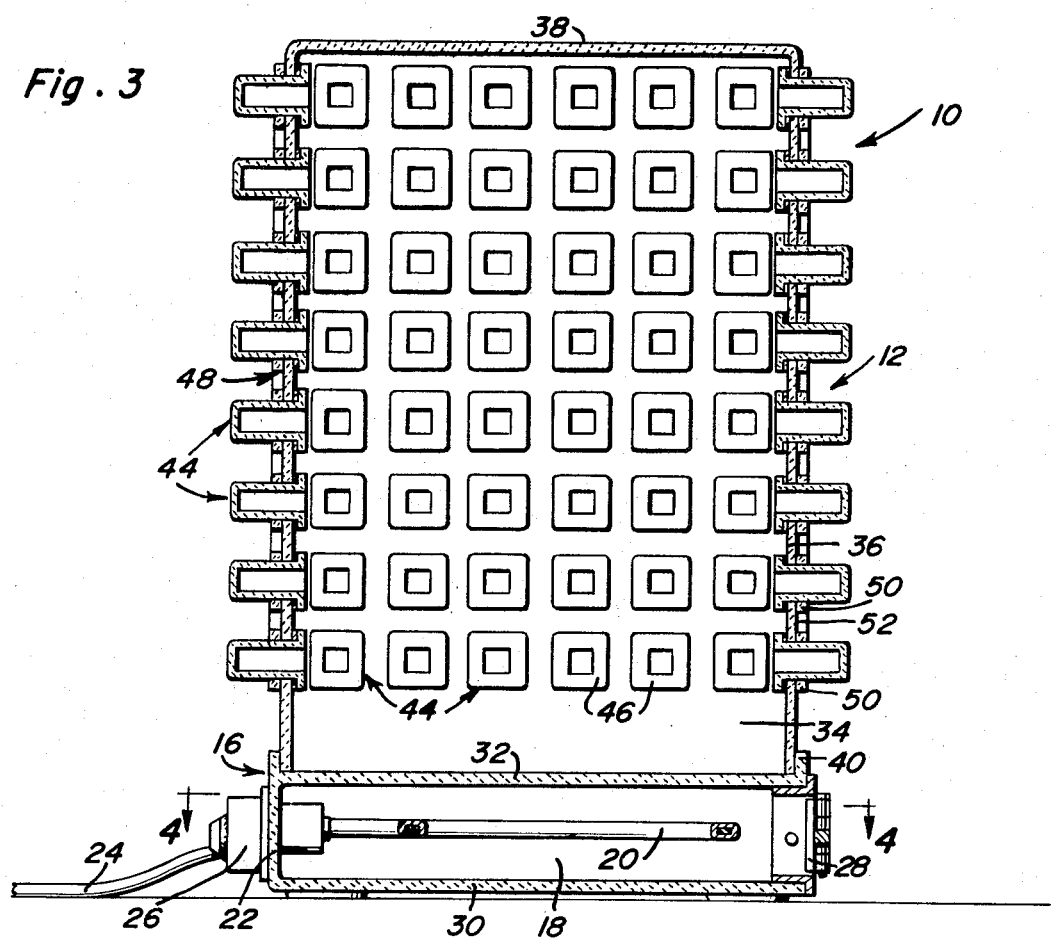
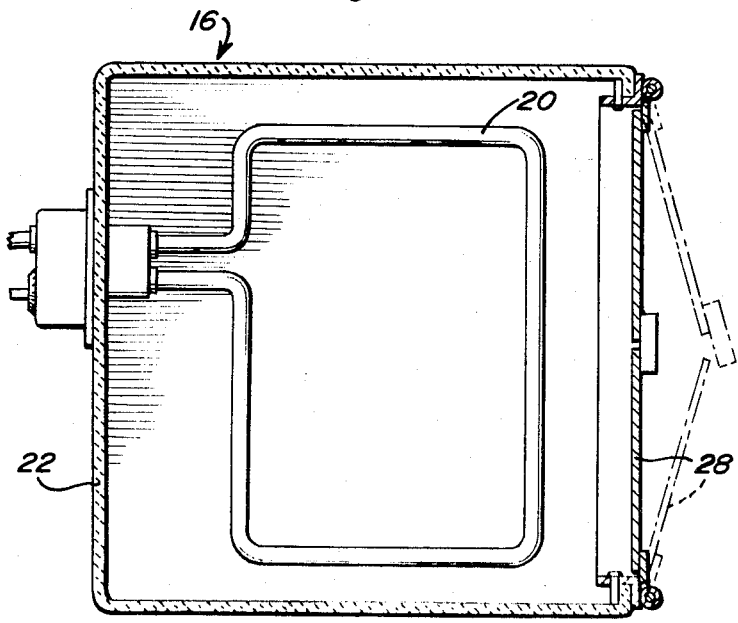
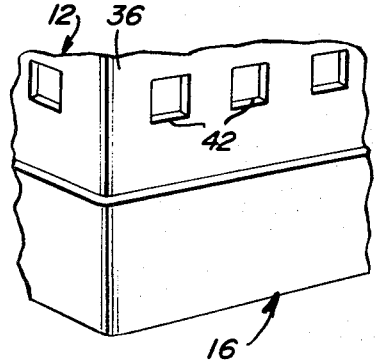
Fig. 3
Fig. 4
Fig. 5
Carlo M. Marchesi
INVENTOR.

CLAY AREA HEATER

The present invention generally relates to area heaters, and is more particularly concerned with a heater wherein the heating unit is utilized for only relatively short periods of time with the heater itself storing the heat and effecting a radiation of the heat over extended periods of time.

In conjunction with the above, it is a significant object of the instant invention to provide a heater which is of both a simple and economical construction, while at the same time having substantial heating capabilities.

Also of significance with regard to the instant invention is the provision of a heater which is substantially maintenance free and economical in operation.

Basically, the objects of the instant invention are achieved through the construction of a heater utilizing clay with the molded clay being twice baked so as to achieve a high degree of hardness which substantially enhances the durability of the heater and results in the substantial ability of the heater to radiate stored heated over extended periods of time. The construction itself includes a lower heating unit, mounting a gas or an electric heating element, and an upper heat storing chamber surrounded by outwardly projecting hollow members which provide multiple radiating surfaces.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged cross-sectional view taken substantially on a plane passing along line 3—3 in FIG. 1;

FIG. 4 is a cross-sectional view taken substantially on a plane passing along line 4—4 in FIG. 3;

FIG. 5 is a perspective detail of a lower portion of the heater with various components removed for purposes of illustration;

Figure 1:
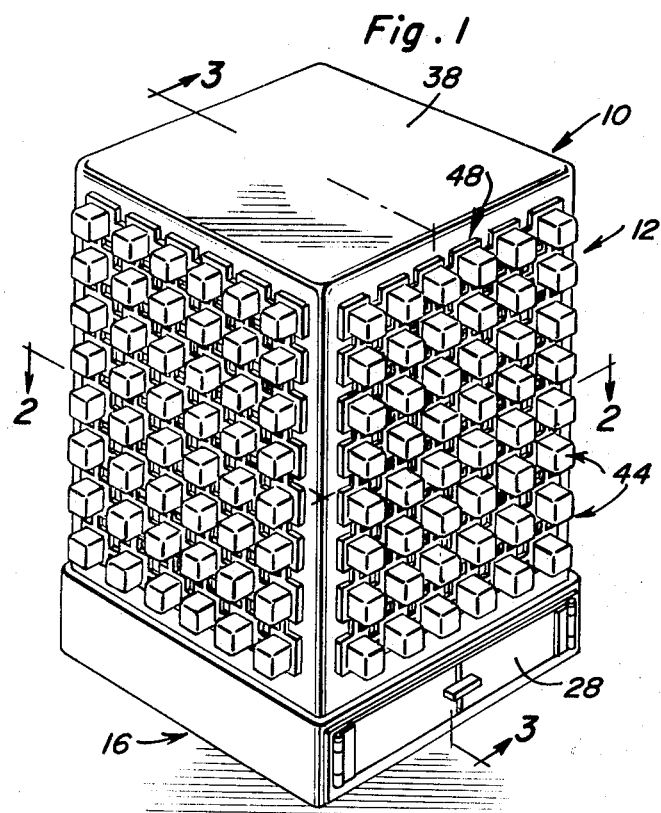
FIG. 1 is a perspective view of the clay area heater comprising the instant invention.
Figure 6:
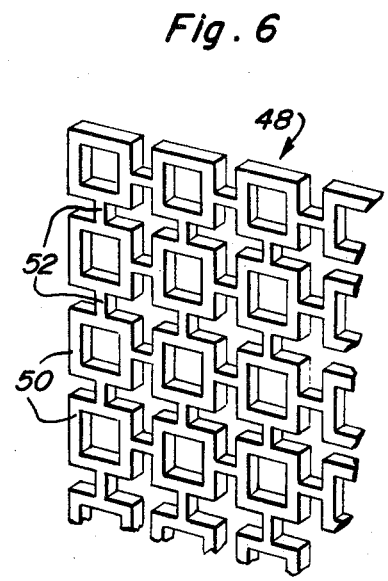
FIG. 6 is a perspective detail of the supporting grid for the projecting members.
Figure 2:
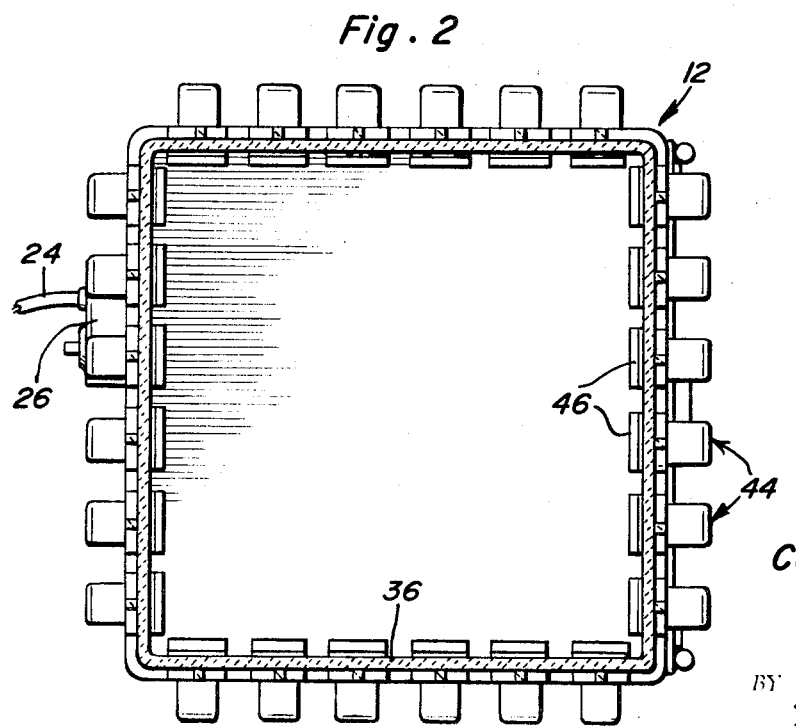
FIG. 2 is an enlarged cross-sectional view taken substantially on a plane passing along line 2—2 in FIG. 1.
Figure 7:
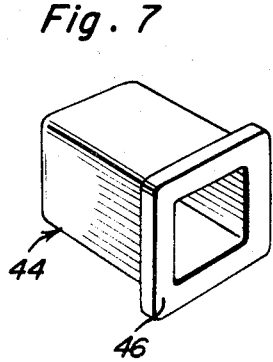
FIG. 7 is a perspective view of one of the heat radiating projecting members.

Referring now more specifically to the drawings, reference numeral 10 is used to generally designate the area heater comprising the instant invention. The heater 10 includes upper and lower units 12 and 16, respectively, the upper unit being in the nature of and heat storing and radiating unit, while the lower unit 16 comprises the heating unit.

The lower heating unit 16 is rectangular and of a relatively low height, having an enlarged internal chamber 18 defined therein. The chamber 18 incorporates an appropriate heating element 20, either gas or electric, mounted on and supplied through one side wall 22. As will be appreciated, if the heating element 20 is electric, power will be supplied through an appropriate conductor wire 24. Should a gas heating element be utilized, the supply line will be in the nature of a gas line. In either event, an appropriate timing mechanism is provided within the control box 26 so as to sequentially activate and deactivate the heating element as required so as to achieve the desired effect. Normally, it is contemplated that the heating element be deactivated for a period of time substantially greater than the period of activation in that the upper unit 12 is capable of rapidly absorbing and storing heat and subsequently radiating the stored heat over an extended period of time.

Access to the interior of the heating unit chamber 18 is provided by means of a pair of hinge mounted doors 28, which doors 28 in fact define the wall opposed from the heating element mounting wall 22.

Aside from the doors 28 and mounting frame therefor, the lower heating unit 16, including the peripheral walls, flat bottom 30 and flat top 32, are formed of clay, for example red clay or kaolin, the clay in each instance preferably being baked or fired twice so as to achieve a high degree of hardness and durability.

The top 32 of the heating unit 16 is in the nature of a relatively thin plate and divides the heating element chamber 18 from the enlarged internal heat storing chamber 34 of the upper storing and radiating unit 12. The upper unit 12 consists of an enlarged rectangular housing having peripheral walls 36 and a flat top 38. The lower edges of the walls 36 sit on the lower unit 16, for example immediately within retaining flanges 40 provided peripherally about the top plate 32 of the lower unit 16. In this manner, heat generated by the heating element 20 is conducted through the top plate 32 into the enlarged overlying internal chamber 34.

The four peripheral walls 36 include a plurality of rectangular apertures or openings 42 therethrough provided in horizontally and vertically aligned rows. These apertures 42 receive enlarged hollow rectangular members 44 therethrough. Each of the members 44 includes an outwardly projecting peripheral flange 46 about the inner end thereof which engages and is cemented or otherwise appropriately fastened to the inner surface of the corresponding wall 36. The remainder of the member 44 projects a substantial distance outward from the wall 36 with the hollow interior of the member 44 opening solely through the inner end thereof into communication with the upper enlarged housing chamber 34. In this manner, substantial internal space will be added to the upper heat storing chamber in conjunction with a substantial increase in the exposed heat radiating surface area.

The projections or projecting members 44 associated with each wall 36 are braced by an external grid or screen 48 cemented or otherwise appropriately affixed to the outer face of the wall 48. This grid is defined by a series of vertically and horizontally aligned rectangular collars 50 which snugly receive the projecting members 44 therethrough, the collars 50 being interconnected by integral bars 52 which provide a bracing effect between adjacent collars and the projecting members 44 receive therethrough. As was the case with the lower unit 16, the upper unit 12, including all of the components thereof, is formed of an appropriate clay, for example red clay or kaolin, which has been baked or fired twice so as to achieve substantial strength and durability. This, in conjunction with the relatively inexpensive nature of clay, provides an economical apparatus.

In addition to the economical nature of the heater, the particular construction thereof uniquely adapts it for highly efficient operation wherein the heating element 20 need be activated for only relatively short periods of time. This is the case in that the apparatus is capable of quickly storing heat and subsequently, after a shutting off of the heating element, radiating the heat over extended periods of time, notwithstanding the deactivation of the heating element itself.

From the foregoing, it will be appreciated that a highly unique area heater has been defined. This heater is economical in both construction and operation, in addition to being compact and attractive. The efficiency of the heater arises in large part from the construction of the heater in a manner whereby heat can be rapidly stored and subsequently slowly radiated, thus necessitating the actual energization of the heating element for only short periods of time. The use of clay as the material of the heater is also considered to contribute significantly both to the economical nature of the unit and to the ability of the unit to perform as desired. The compact nature of the heater enables one to move the heater as desired, requiring only the presence of a source of gas or electricity depending on the type of heating element used, thus further enhancing the economic feasibility of the heater.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An area heater comprising a heating unit and a housing overlying said heating unit and defining an enlarged internal chamber in heat receiving relation to said heating unit, said housing including a closed top and peripheral walls, at least a portion of said walls including hollow projections, said projections projecting outwardly beyond the walls and opening internally into communication with said chamber whereby an enlarged heat storing area is provided in conjunction with a corresponding enlargement of the heat radiating surfaces, said projections comprising individual members slidably received through apertures defined in said walls.

2. The heater of claim 1 including a supporting grid surrounding and supporting said individual members, said grid being engaged and mounted on the corresponding walls through which the members project.

3. The heater of claim 2 wherein said housing is rectangular, including four walls, said projecting members extending beyond all four walls.

4. The heater of claim 3 wherein said heating unit includes an internal chamber with selectively closable access means provided thereto, said heating unit chamber receiving a heating element, and means for periodically activating and deactivating said heating element.

5. The heater of claim 4 wherein said housing is constructed of baked clay.

6. The heater of claim 5 wherein said clay is baked twice.

7. An area heater comprising a heating unit and an enlarged housing overlying said heating unit, said heating unit defining a base for said housing, said housing incorporating an enlarged internal chamber in heat receiving communication with said heating unit, said heating unit incorporating a heating element therein, access means allowing selective access to said heating element, said heating unit, aside from said access means and heating element, being constructed of baked clay, said housing likewise being formed of baked clay, said housing incorporating peripheral walls which define the internal chamber therein, said peripheral walls providing a surface area capable of slowly radiating the heat received and stored within the chamber.

8. The heater of claim 7 including outwardly extending projection means on the housing walls for increasing the heat radiating surface area.

* * * * *